Figure 1:
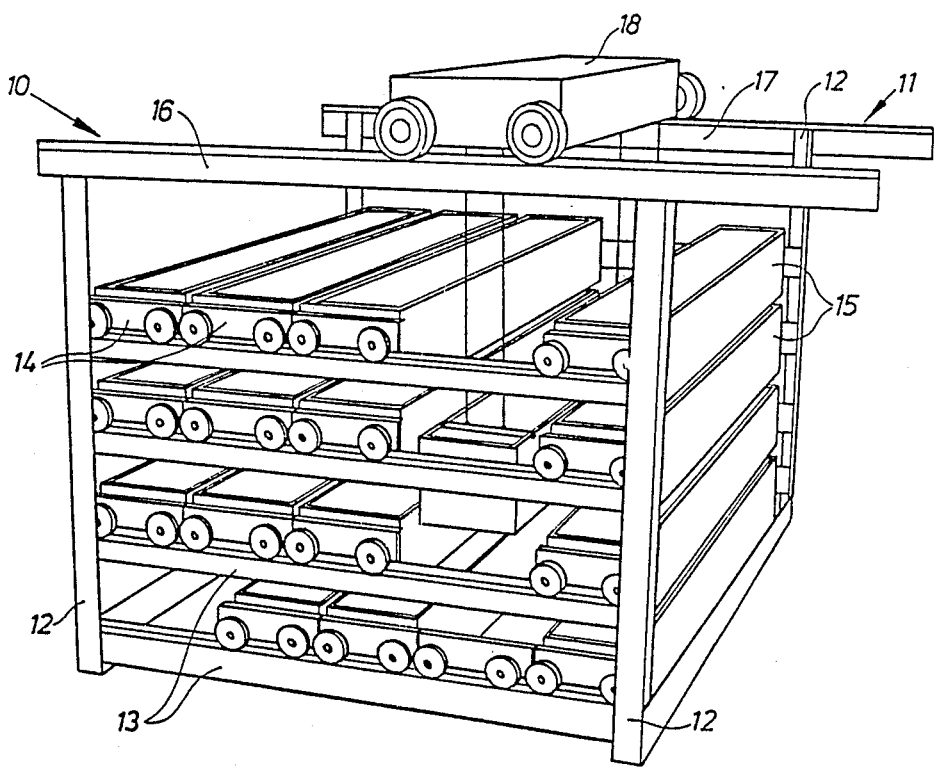

United States Patent [19]

Báck

[11] Patent Number: 4,834,607
[45] Date of Patent: May 30, 1989

[54] STORAGE SYSTEM
[75] Inventor: Anders S. Báck, Åmål, Sweden
[73] Assignee: Electrolux Constructor Aktiebolag, Saffle, Sweden
[21] Appl. No.: 48,627
[22] Filed: May 11, 1987
[30] Foreign Application Priority Data May 13, 1986 [SE] Sweden ............................ 8602154

[51] Int. Cl.$^4$ ............................................ B65G 1/10
[52] U.S. Cl. .................................. 414/267; 312/201; 104/172.2; 213/75 A
[58] Field of Search ............ 104/172.1, 172.2, 172.3, 104/162; 213/75 A, 75 R; 312/201, 198; 414/267, 286

[56] References Cited

U.S. PATENT DOCUMENTS

| | | | |
|---|---|---|---|
| 2,772,639 | 12/1956 | Ingold | 312/201 X |
| 3,055,313 | 9/1962 | Stoll et al. | 104/172.3 X |
| 3,168,361 | 2/1965 | Naito | 104/162 X |
| 4,170,292 | 10/1979 | Lang | 104/162 X |
| 4,568,233 | 2/1986 | Baker et al. | 414/267 |

FOREIGN PATENT DOCUMENTS 109950 5/1984 European Pat. Off. ............ 414/267
1505990 10/1969 Fed. Rep. of Germany ... 104/172.1

Primary Examiner—Frank E. Werner
Assistant Examiner—Gary Cundiff
Attorney, Agent, or Firm—Alfred E. Miller

[57] ABSTRACT

This invention relates to a storage system comprising a rack having at least two opposite walls each wall being provided with several horizontal tracks, one above the other, for permanently applied carriages running along the tracks, the carriages at the first wall cooperating with the carriages at the second wall so that the carriages in pairs serve as a support for a load carrying element extending between the carriages on each horizontal plane possibly with the exception of a lower plane being movable in such a way that it is possible to create a free space above each load carrier element, a hoisting device being movable horizontally above the load carrier elements and vertically in the free space above any of the uncovered carrier elements. Each horizontal track or cooperating pair of tracks has a common drive means by means of which a suitable number of the carriages which are moved along the track or tracks can be moved simultaneously to form the free space.

4 Claims, 4 Drawing Sheets

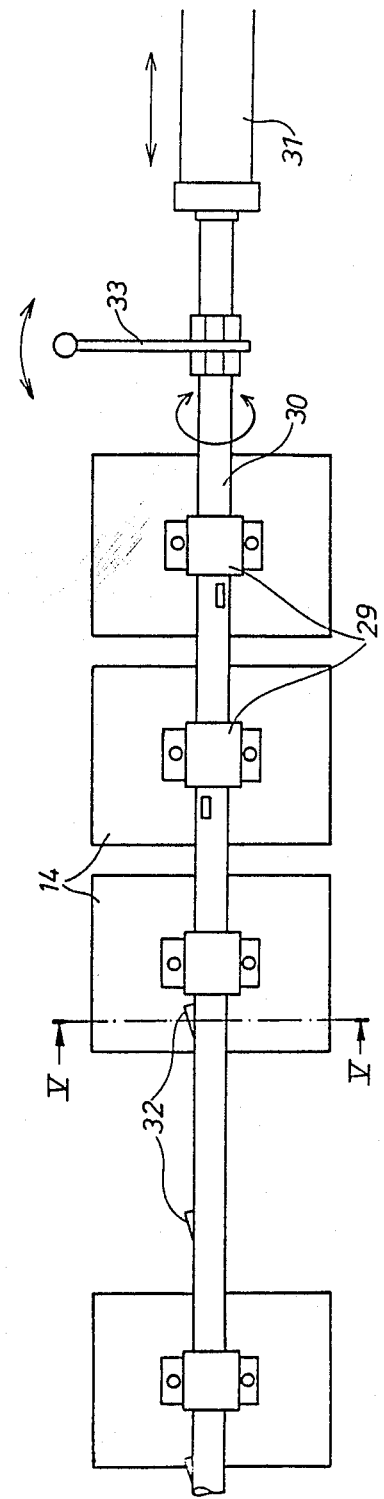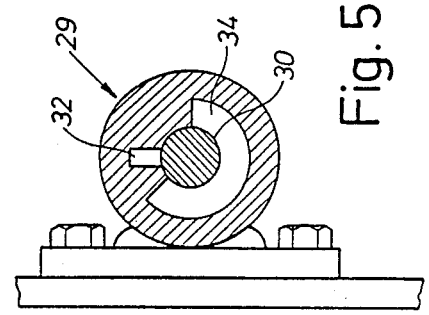

STORAGE SYSTEM

This invention relates to a storage system comprising a rack having at least two opposite walls each wall being provided with several horizontal tracks, one above the other, for permanently applied carriages running along the tracks, the carriages at the first wall cooperating with the carriages at the second wall so that the carriages in pairs serve as a support for a load carrying elements extending between the carriages, the carriages on each horizontal plane possibly with the exception of a lower plane being movable in such a way that it is possible to create a free space above each load carrier element, a hoisting device being movable horizontally above the load carrier elements and vertically in the free space above any of the uncovered load carrier elements.

Systems of the above type are previously known for storing elongated goods, seen in EP No. 109950. In such systems the carriages are moved to their intended positions before the goods is taken out from or being inserted into the system manually or by means of electric motors which are positioned on the carriages.

According to this invention a new simple type of drive system for the carriages is suggested, the drive system being common for each track or pair of tracks and making it possible to control the movement of the carriages carefully without using an expensive electric motor drive for each carriage.

Figure 2:
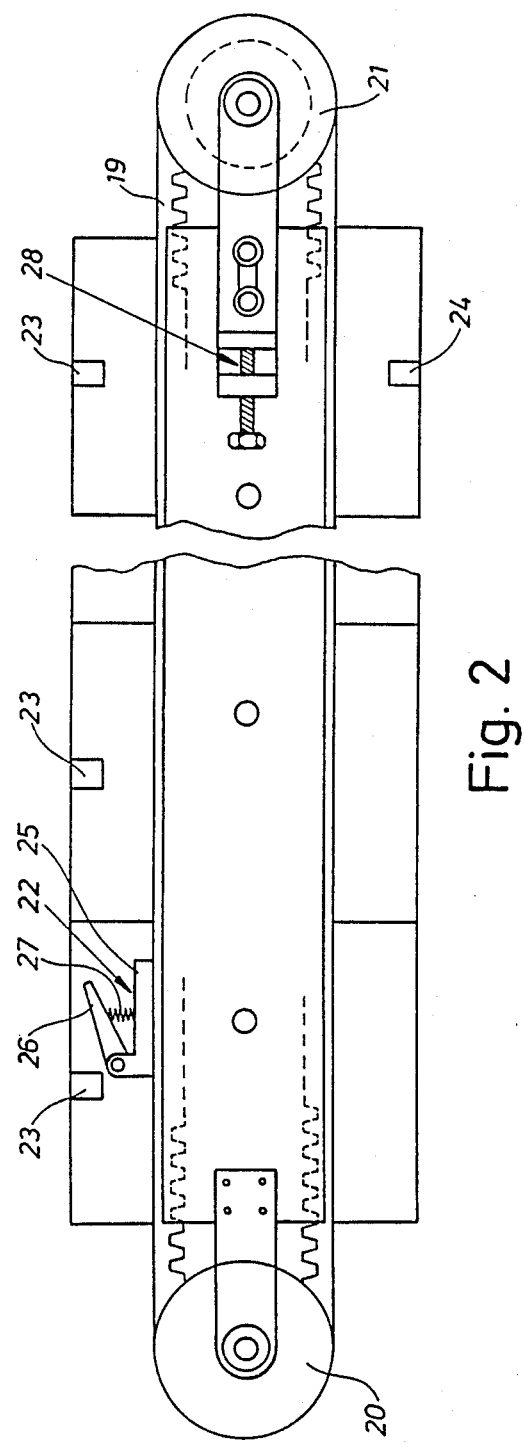

Several embodiments of the invention will now be described with reference to the accompanying drawings in which FIG. 1 is a perspective view of a storing system in which the invention will be used whereas, FIG. 2 is a side elevation view of a first embodiment of a drive mechanism for the carriages and, FIGS. 3 a-e are diagrammtic views of the working principle of the device shown in FIG. 2.

Figure 6:
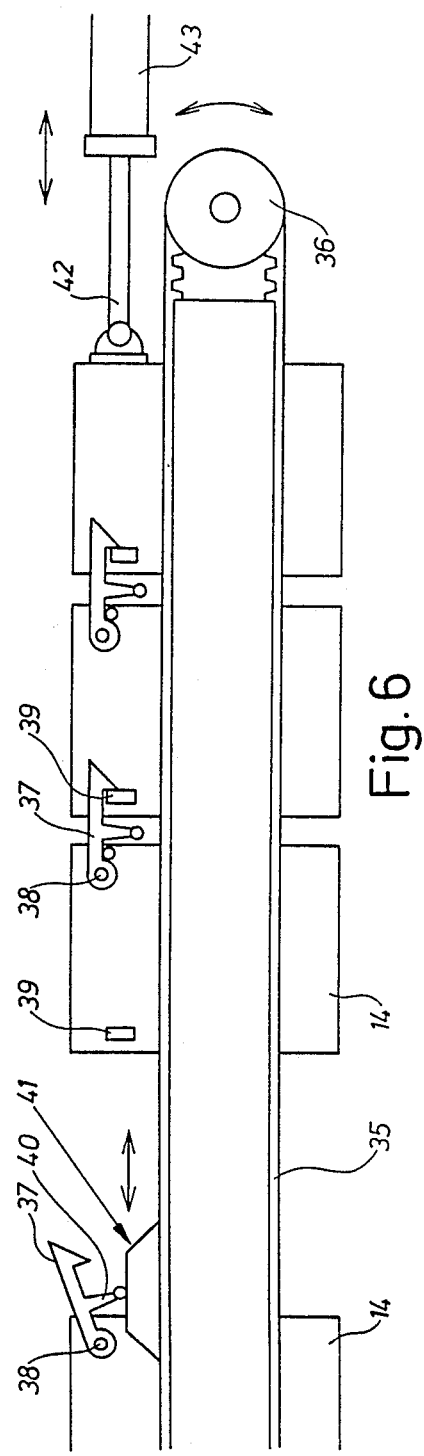

FIGS. 4 and 5 is a side elevation view and a section, respectively, of a second embodiment of the invention whereas, FIG. 6 is a side elevation view of a third embodiment of the invention.

As seen in FIG. 1 the storage system comprises a rack having two opposite supports 10, 11 with columns 12 and horizontal profiles 13 forming tracks on different horizontal levels and supporting carriages running along the tracks. The carriages of the two walls cooperate in pairs and support load carrying elements on which goods of any type can be stored. The carriages with the load carrying elements, which might form an integrated unit, can be moved along the tracks so that a free space can be formed between any of adjacent carriages, the width of the space preferably being larger than the width of the carriages or the load carrying elements.

The upper horizontal profiles 16 and 17 of each supports accomodate a traverse 18 or the like which can be moved above the load carrying elements. The traverse is provided with a hoisting device by means of which any load carrying element or goods after separation of suitable carriages on the levels which are situated above the relevant load carrying element can be lifted out from or be inserted into the rack.

In order to move the carriages to suitable positions a device according to FIG. 2 can be used. This device comprises a toothed belt 19 running about two pulleys 20 and 21 placed at the end of each horizontal track. The two parts of the belt are horizontal and placed at the end of and outside the carriages so that a follower 22 which is fixed to the belt, when the belt is moved, acts on an upper shoulder 23 which is provided on each carriage and a lower shoulder 24 which is provided on one of the outer carriages. One of the pulleys 20 and 21 respectively is toothed and is driven by a reversible electric motor not shown. The follower 22 comprises a base plate 25 which is fixed to the belt and an arm 26 which is pivotably attached to this plate 25 and is kept in an upper position by means of a spring 27. In order to compensate for extension of the drive belt if any, there also is a tightening device 28.

The device operates in the following manner as is seen in FIGS. 3a-e.

Figure 3A:
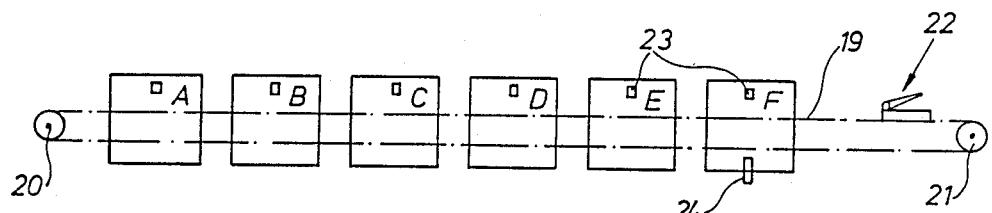

From start the follower 22 is placed in the position shown in FIG. 3a. It is assumed that goods shall be picked up from a load carrier element, not shown, under the carriage D in the figure which means that the carriages D, E, F have to be moved to the right in the figure.

Figure 3B:
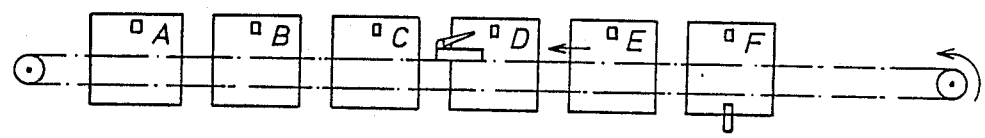
Figure 3C:
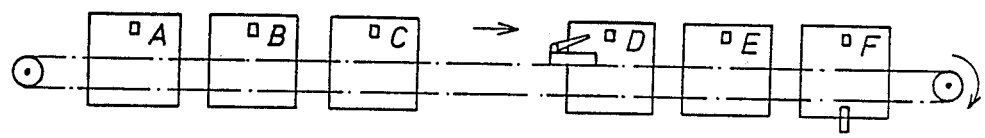
Figure 3D:
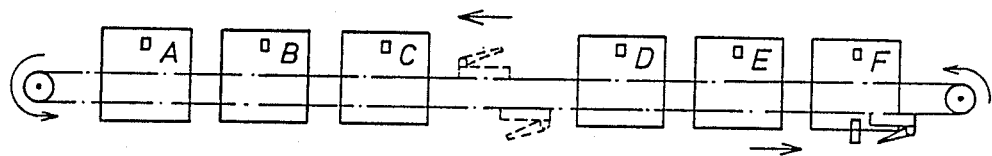
Figure 3E:
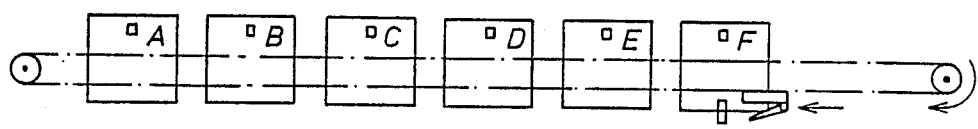

In order to effect such a movement the belt is driven counterclockwise and the follower 22 is moved to the left to the position shown in FIG. 3b. During this movement the arm 26 folds back when passing the upper shoulders 23 on the carriages D, E, F. In order to push the carriages D, E, F towards the right the motor, not shown, is then reversed so that the carriages D, E and F by means of the follower arm 26 is moved to the position shown in FIG. 3c. The carriages A, B and C thereby maintain their positions. Then the traverse is moved to a position above the openings and the goods or the complete load carrier element is lifted or lowered between the carriages C and D by the hoisting device illustrated in FIG. 1 the follower 22 thereby maintaining its position. In order to reset the system the motor, not shown, is activated so that the belt is driven counterclockwise in the figure which means that the arm 26 folds back when engaging the shoulders 23 on the carriages A, B, and C and continues about the pulley 20 to the right in the figure passing the lower shoulder 24 of the outer carriage F to the position shown in FIG. 3d where it stops. Then the motor is again reversed which means that the carriages D, E, F are returned to the left in the figure to the position shown in FIG. 3e. By activating the motor the follower is then moved back counterclockwise to the position shown in FIG. 3a.

It is of course possible whithin the scope of the invention to put shoulders also on the carriages A, B, C, D, E in the same position as the lower shoulder on the carriage F in order to increase the opening and closing time when moving the different carriages.

The enbodiment shown in FIG. 4 comprises carriages 14 which by means of wheels, not shown, move on the horizontal tracks 13 shown in FIG. 1. The carriages at their ends have a lug 29 surrounding a shaft 30. This shaft can be driven in the axial direction by means of a piston-cylinder arrangement 31 and has several dowels 32 which are axially and peripherially displaced with respect to each other. The shaft can also be pivoted by a turning means 33. Each lug 29 has a slot 34 through which a dowel can be moved without influencing the carriage at a certain angle position of the shaft whereas turning the shaft to another angle position means that the follower dowel engages the lug when the shaft is moved thereby moving the carriage. By means of a combined pivoting operation by the turning means 33 and movement of the shaft 30 by means of the cylinder 31 a suitable follower can be engaged with a suitable lug so that an opening is created at the place where it is desirable.

The embodiment shown in FIG. 6, as well as the embodiment shown in FIGS. 2–3, comprises a drive belt 35 supported by two wheels 36 of which only one is shown in the drawing. The carriages 14 runs, as has been described above, on wheels not shown on the horizontal tracks and are provided with clasps 37 which are pivotably supported on the carriages by means of dowels 38. Each clasp engages a shoulder 39 on an adjacent carriage and has a pushing rod 40 which, when acted on by a follower 41 on the drive belt, moves the clasp 37 out of engagement with the shoulder 39. The clasps 37 are each provided with a cam surface which is so shaped that the clasps in their free state when engaging a shoulder 39 are lifted and automatically hook into an adjacent carriage. One of the outer carriages, in this case the right one, is via a piston rod 42 connected to a cylinder 43. By moving the belt 35 so that the follower 41 moves below a suitable pushing rod 40 the clasp 37 is lifted thereby making the two adjacent carriages free from each other. Activating the cylinder 43 now means that the two carriages are separated from each other and leave an opening through which the hoisting device can be lowered to pick up or deliver goods. When the pick-up or delivering operation has been completed the cylinder 43 is again acted on so that the piston rod 42 moves the carriages to their original positions that is to the compacted position at the left hand side of the figure.

It should be observed that it is desirable to achieve a synchronous movement of the two carriages supporting the load supporting element whereby a device of the type described above can be placed at each wall or by transferring the belt movement by means of a transmission from one wall to the other. In order to control the movement of the carriages automatically the drive means are preferably connected to suitable electronic equipment.

It is also possible to use a hoisting device which is movable in the length direction of the load carrier elements i.e. between the cooperating carriages in order to pick up goods which is placed at any position on the load carrier elements. Such a movement possibility could be achieved by providing the traverse with a shuttle which by any suitable means can be moved perpendicular to the direction of movement of the traverse, the shuttle supporting a hoisting device which can be lowered to pick up or deliver the goods.

I claim:

1. A storage system including a rack having at least two opposite supports, each being provided with a plurality of horizontally disposed, spaced, superposed tracks, each of said tracks having a carriage thereon, a load hoisting device provided with a load carrying element, the carriages at the first support co-acting with carriages at the second support so that the carriages in pairs serve as a support for said load hoisting device for lowering and raising said load carrying element between said carriages, the carriages on at least one horizontal track being movable in a manner whereby it is possible to create a free space between selected carriages, said hoisting device being movable on said supports above said carriages in a horizontal plane to a position whereby said load carrying element can be lowered and raised vertically in said free space, a common drive means for the carriages on said horizontal tracks by means of which a predetermined number of carriages which are movable on said tracks can be moved simultaneously to form said free space, said drive means comprising a shaft having a plurality of dowels, said shaft extending parallel to said tracks, and means connected to said shaft for moving the same in an axial direction whereby when said shaft is turned said dowels can be brought into engagement with said carriages in order to move said carriages.

2. A storage system as claimed in claim 1 wherein said, drive means comprises a drive unit which is connected to one of the carriages on the horizontally disposed track whereby a number of remaining carriages on the same track can be connected to a driven carriage.

3. A storage system as claimed in claim 1 wherein said carriages co-act in order to support said load carrying element and are driven in synchronism with each other.

4. A storage system as claimed in claim 1 wherein said hoisting device is movable perpendicular to the direction of movement of the carriages.

* * * * *